United States Patent [19]

Swetnam et al.

[11] 4,361,002
[45] Nov. 30, 1982

[54] STICK HOLDER AND DEPOSITION DEVICE

[75] Inventors: Larry D. Swetnam; James H. Casada; Linus R. Walton, all of Lexington, Ky.

[73] Assignee: The University of Kentucky Research Foundation, Lexington, Ky.

[21] Appl. No.: 250,222

[22] Filed: Apr. 2, 1981

[51] Int. Cl.³ ............................................. A01D 45/16
[52] U.S. Cl. .................................... 56/27.5; 248/539; 248/544
[58] Field of Search ................. 56/27.5; 248/514, 515, 248/516, 285, 539, 544

[56] References Cited

U.S. PATENT DOCUMENTS

| 278,973 | 6/1883 | Kizer | 248/514 |
|---|---|---|---|
| 1,035,739 | 8/1912 | Raes | 248/515 |
| 3,246,865 | 4/1966 | Latimer | 248/515 |
| 3,593,506 | 7/1971 | Casada | 56/27.5 |
| 4,216,642 | 8/1980 | Spratt et al. | 56/27.5 |

Primary Examiner—Robert A. Hafer
Attorney, Agent, or Firm—Birch, Stewart, Kolasch & Birch

[57] ABSTRACT

The present invention is directed to a device for positioning a stick relative to a harvesting aid. The stick holder mounts a stick relative to an operator positioned on a harvesting aid. The stick holder is designed to adjust the height and angle of the stick relative to the operator. In addition, a plant holding trough is provided adjacent to the stick holder to retain the harvested crops prior to a loaded stick being discharged from the stick holder.

9 Claims, 2 Drawing Figures

STICK HOLDER AND DEPOSITION DEVICE

BACKGROUND OF THE INVENTION

1. Field of the Invention

The present invention is directed to a stick holder which is used in combination with a harvesting aid. The stick holder is designed to easily adjust the height and angle of the stick relative to an operator positioned on the harvesting aid.

2. Description of the Prior Art

It is conventional in harvesting certain row crops, especially tobacco, to hand harvest the crops. Specifically, the crops are manually cut and manually impaled onto a long stake. After approximately six crops are positioned on the stake, the harvester will position the filled stake on the ground and proceed to harvest additional crops and position them on another stake.

A machine has been developed which automates the harvesting of tobacco. More specifically, U.S. Pat. No. 4,216,642, issued to Spratt et al discloses a tobacco harvesting apparatus wherein an individual stands on an operator's station 28 to grasp severed tobacco plants and impale them on an upwardly projecting stick 80. Thereafter, the filled stick 80 is lifted by the operator and positioned on the rear deck 88. After a number of filled sticks are positioned on the rear deck 88, the operator pivots the rear deck 88 to deposit the filled stakes onto the ground.

SUMMARY AND OBJECTS OF THE INVENTION

It is an object of the present invention to provide a stick holder which may be used in combination with a harvesting aid.

A further object of the present invention is to provide a stick holder which may easily adjust the height and angle of the stick relative to an operator positioned on the harvesting aid.

A further object of the present invention is to provide a plant holding trough which is disposed adjacent to the stick holder to retain harvested crops prior to being discharged from the stick holder onto the ground surface.

Another object of the present invention is to provide a stick holder wherein an operator may easily discharge a filled stick therefrom by merely rotating the stick in its lower end pocket and permitting the stick to slide down a discharge chute under the influence of gravity.

These and other objects of the present invention are accomplished by providing a stick holder which is adjustably mounted relative to a support frame of a harvesting aid. The stick holder permits adjustment of the height and angle of the stick relative to an operator positioned on the harvesting aid. A plant holding trough is provided adjacent to the stick holder to retain the harvested crops prior to a filled stick being discharged onto the ground surface.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
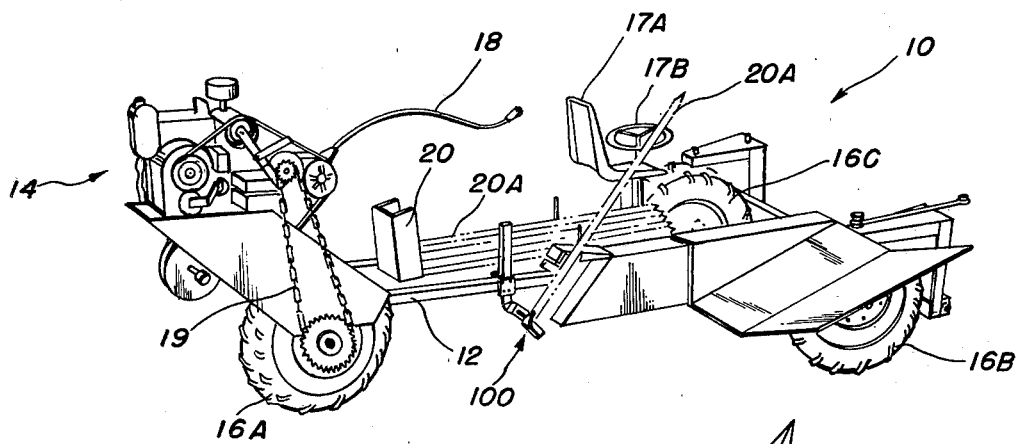
FIG. 1 is a side perspective view illustrating the stick holder of the present invention as it is positioned on a harvesting aid.

As illustrated in FIG. 1, the present invention is directed to a stick holder 100 which is positioned on a harvesting aid 10. the harvesting aid 10 includes a support frame 12 which is mounted on at least three wheels 16A, 16B, and 16C. The rear wheel 16A is operatively connected to a motor 14 by means of a chain drive 19. A control rod 18 is utilized to control the speed and the movement of the harvesting aid 10.

An operator's seat 17A is positioned on the support frame 12 adjacent to the forward end thereof. Positioned in close proximity to the operator's seat 17A is a steering wheel 17B which may be utilized by the operator to initially steer the harvesting aid 10 onto a row of crops. After the harvesting aid 10 is positioned to be parallel with a row of crops, the steering of the harvesting aid may be controlled by a self-steering cutter, not illustrated in FIG. 1. In addition, the harvesting aid 10 may be incrementally advanced along the row of crops by means of an automatic speed control device, not illustrated, disposed on the motor 14. Further, the operator may control the forward speed of the harvesting aid 10 by means of the control rod 18.

As illustrated in FIG. 1, a stick holder 100 is disposed adjacent to one side of the support frame 12. In addition, a stick storage rack 20 is positioned in close proximity to the operator's seat 17A. In this manner, an operator may readily grasp a stick 20A and position it in the stick holder 100 for the subsequent impaling of additional crops to be harvested onto the stick.

Figure 2:
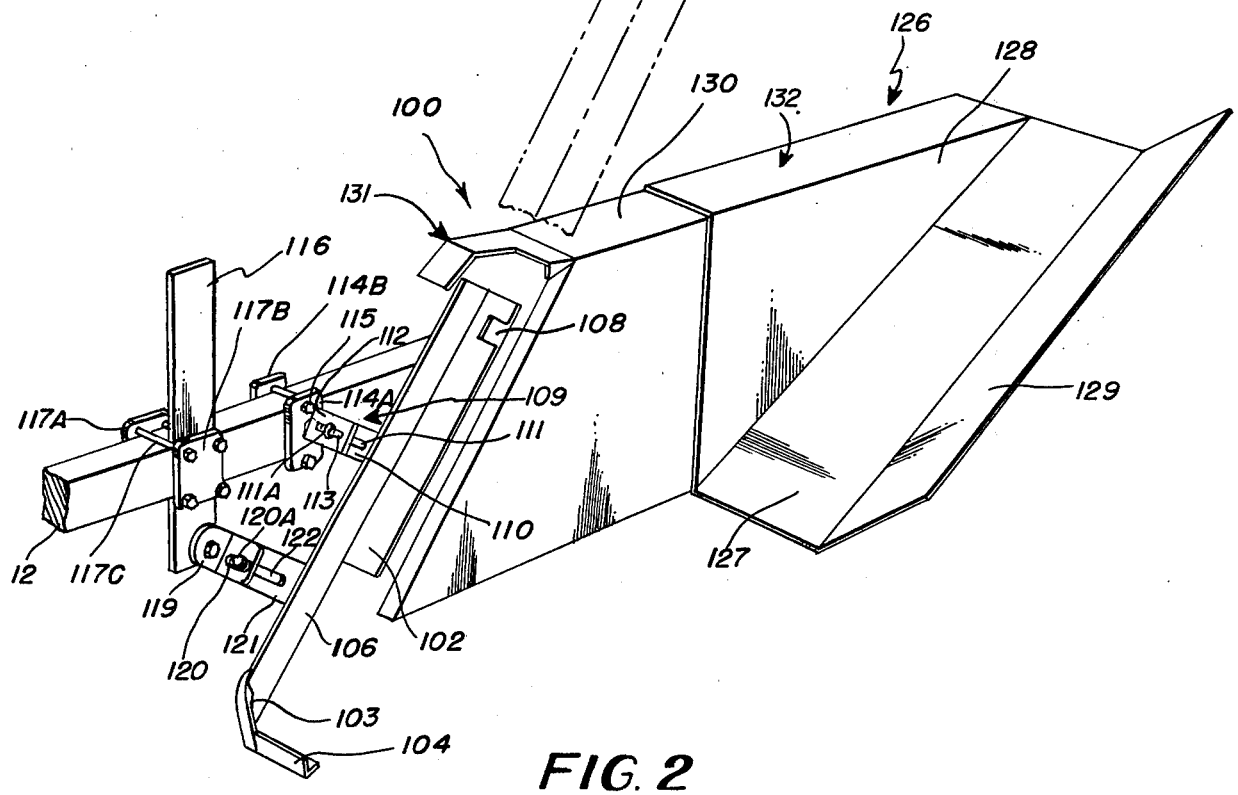
FIG. 2 is an enlarged perspective view illustrating the stick holder according to the present invention.

As illustrated in FIG. 2, the stick holder 100 engages a stick which is shown in dotted lines as 20A. The stick is positioned within the stick holder 100 so that the bottom point engages the pocket or abuttins 103 and a surface side of the stick engages the bottom member 102. Side members 106, 108 retain the stick within the stick holder 100 during the positioning of the crops onto the free pointed end of the stick 20A.

The vertical angle of the stick may be adjusted by the angular adjustment member 109. A holding frame 114A, 114B retains the angular adjustment member 109 on the support frame 12 by mans of bolts 115. An L-shaped bracket 112 is positioned on the holding frame 114A. The L-shaped bracket 112 includes an elongated slot 113. A support bracket 110 is affixed to the side member 106. The support bracket 110 includes an elongated slot 111. A bolt 111A is disposed within the elongated slots 111, 113 and permits a lateral adjustment of the stick holder 100 relative to the support frame 12. The angular adjustment of the stick holder 100 is effected by moving the holding frame 114A, 114B along the length of the support frame 12.

The stick holder 100 includes a vertical adjustment rod 116. The vertical adjustment rod 116 is retained on the support frame 12 by means of a holding frame 117A, 117B. The holding frame 117A, 117B is retained relative to the support frame 12 by means of bolts 117C. An L-shaped bracket 119 is affixed to the vertical adjustment rod 116. The L-shaped bracket 119 includes an elongated slot 120. A support bracket 121 is affixed to the side member 106. The support bracket 121 includes an elongated slot 122. A bolt 120A is positioned within the elongated slots 120, 122 to permit the stick holder 100 to be adjusted laterally relative to the support frame 12. The vertical height of a stick 20A may be adjusted by moving the vertical adjustment rod 116 relative to the support frame 12. Similarly, adjusting the vertical height of a stick 120 will change the angle of the stick relative to an operator positioned within the operator's chair 17A.

A plant holding trough 126 is provided adjacent to the forward end of the stick holder 100. The plant holding trough 126 includes a stationary support member 130. The stationary support member 130 is mounted adjacent to the upper end of the bottom member 102 and includes a guide portion 131 which encircles a side portion of the side member 106. A movable trough section 132 is positioned adjacent to the stationary support 130. The movable trough section 132 includes a receiving portion 127 and outwardly and upwardly projecting side walls 128, 129. As illustrated in FIG. 1, the plant holding trough 126 is designed to retain the harvested crops above the ground surface as the harvesting aid 10 progresses along a row of crops. In addition, the receiving portion 127 and the side wall 128 ensure that the harvested crops do not interfere with the rotation of the wheel 16B.

In operation, an operator positioned within the operator's chair 17A would grasp a stick 20A and position it within the stick support 100. Thereafter, the harvesting aid 10 would incrementally advance along a row of crops to sever the crops at ground level. The operator would grasp the severed crops and impale the stock portion onto the stick 20A. The upper portion of the harvested crops would rest against the plant holding trough 126. After approximately six plants are harvested and impaled onto the stick 20A, the operator would rotate the butt ends of the top one or two stalks with his right hand while holding the top end of the stick with his left hand. The butt ends of the stocks are rotated around the stick in a clockwise direction to form an angle with the other plants. Thereafter, the operator pushes the top end of the stick in a rearward direction, without lifting the weight of the filled stick with his left hand, causing the stick 20A to rotate about its lower end in the or abutting surface pocket 103 of the stick holder 100. This movement of the stick 20A causes the stick to be released from the stick holder 100 and to slide down the discharge chute 104 under the influence of gravity. The discharged stick comes to rest on the ground in a stable three-point configuration. The three-point configuration consists of the lower end of the stick 20A, the top of the plants which are rotated, and the tops of the plants which slide down the receiving portion 127 of the plant holding trough 126. Discharging the filled stick 20A in this manner leaves the plants standing in a position suitable for field wilting in a location which will not interfere with the operation of the harvesting aid 10 while it is harvesting the adjacent row of crops.

The stick holder 100 used in combination with the harvesting aid 10 is particularly adapted for harvesting tobacco. As is conventional, it is desirable to field wilt tobacco after it is initially harvested. The stick holder 100 permits harvested tobacco plants to be deposited on the ground surface so that they are able to wilt in a satisfactory manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A stick holder for use with a harvesting aid comprising:
   a bottom stick engaging member;
   side members affixed to and projecting upwardly from said bottom stick engaging member for retaining a stick therebetween;
   an abutting surface disposed adjacent to an end of said bottom stick engaging member for retaining an end of a stick disposed therein;
   a discharge chute comprised of an angled, downwardly inclined member positioned adjacent to said abutting surface to guide a stick manually disengaged from said side members as the stick is discharged from said stick holder and falls under the influence of gravity onto the ground surface; and
   at least one support bracke affixed to one of said side members and being adapted for adjustably mounting said stick holder relative to and offset to one side of a support frame of a harvesting aid.

2. A stick holder according to claim 1, and further including a vertically adjustable rod adapted to be adjustably mounted on a support frame for a harvesting aid, said vertically adjustable rod including an L-shaped bracket affixed thereto for attachment to said at least one support bracket.

3. A stic holder according to claim 1, and further including an angular adjustment member adapted to be adjustably mounted on a support frame for a harvesting aid, said angular adjustment member including an L-shaped bracket affixed thereto for attachment to said at least one support bracket.

4. A stick holder for use with a harvesting aid comprising:
   a bottom stick engaging member;
   side members affixed to and projecting upwardly from said bottom stick engaging member for retaining a harvesting stick therebetween;
   an abutting surface disposed adjacent to an end of said bottom stick engaging member for retaining a bottom end of a harvesting stick disposed therein;
   at least two support brackets affixed to one of said side members and being adapted for adjustably mounting said stick holder relative to a support frame of a harvesting aid;
   a vertically adjustable rod adapted to be adjustably mounted on a support frame of a harvesting aid, said vertically adjustable rod including an L-shaped bracket affixed thereto for attachment to one of said at least two support brackets; and
   an angular adjustment member adapted to be adjustably mounted on a support frame of a harvesting aid, said angular adjustment member including an L-shaped bracket affixed thereto for attachment to the other of said at least two support brackets.

5. A stick holder for use with a harvesting aid comprising:
   a stick holder frame including an inclined bottom member, an upwardly projecting side member extending along one side edge of said bottom member and a second side member projecting upwardly from and extending along at least a portion of a second side edge of said bottom member;

an abutting surface disposed adjacent to an end of said upwardly projecting side member for engaging a bottom end of a harvesting stick disposed therein;

said bottom member, upwardly projecting side member, second side member and abutting surface forming a retaining means for engaging, positioning and retaining said harvesting stick;

at least two support brackets being affixed to said upwardly projecting side member and being adapted for adjustably mounting said stick holder relative to a support frame of a harvesting aid;

a vertically adjustable rod adapted to be adjustably mounted on a support frame of a harvesting aid, said vertically adjustable rod including an L-shaped bracket affixed thereto for attachment to one of said at least two support brackets; and an angular adjustment member adapted to be adjustably mounted on a support frame of a harvesting aid, said angular adjustment member including an L-shaped bracket affixed thereto for attachment to the other of said at least two support brackets.

6. A stick holder according to claim 4 or 5, wherein said support bracket and said L-shaped bracket include an elongated slot which permit lateral adjustment of said stick holder relative to a support frame for a harvesting aid.

7. A stick holder according to claim 4 or 5 further including a discharge slot positioned adjacent said abutting surface to guide a stick discharged from said stick holder as it falls under the influence of gravity onto the ground surface.

8. A stick holder for use with a harvesting aid comprising:

a bottom stick engaging member;

side members affixed to and projecting upwardly from said bottom stick engaging member for retaining a harvesting stick therebetween;

an abutting surface disposed adjacent to an end of said bottom stick engaging member for retaining a bottom end of a harvesting stick disposed therein;

at least one support bracket affixed to one of said members for adjustably mounting said stick holder relative to a support frame of a harvesting aid;

a holding trough positioned adjacent to said stick holder for receiving severed plants as they are impaled onto a stick positioned within said stick holder, said holding trough including a stationary support positioned directly adjacent said stick holder and a movable trough portion disposed on said stationary support.

9. A stick holder according to claim 8, wherein said movable trough portion includes a receiving portion and upwardly projecting side walls for receiving a severed plant.

* * * * *